(12) United States Patent
Limell et al.

(10) Patent No.: US 8,192,113 B2
(45) Date of Patent: Jun. 5, 2012

(54) INDEXABLE INSERT DRILL AND A CENTER INSERT THEREFORE

(75) Inventors: Michael Limell, Sandviken (SE); Sören Sjöberg, Köping (SE)

(73) Assignee: Sandvik Intellectual Property AB, Sandviken (SE)

( * ) Notice: Subject to any disclaimer, the term of this patent is extended or adjusted under 35 U.S.C. 154(b) by 1169 days.

(21) Appl. No.: 12/010,363

(22) Filed: Jan. 24, 2008

(65) Prior Publication Data

US 2008/0181737 A1    Jul. 31, 2008

(30) Foreign Application Priority Data

Jan. 29, 2007   (SE) ...................................... 0700237

(51) Int. Cl.
  *B23B 51/02* (2006.01)
(52) U.S. Cl. ......... 408/223; 408/227; 408/713; 407/113
(58) Field of Classification Search .......... 408/187–188, 408/223–225, 227, 230, 713; 407/113; *B23B 51/00, B23B 51/02*
See application file for complete search history.

(56) References Cited

U.S. PATENT DOCUMENTS

| 4,367,991 | A | | 1/1983 | Grafe et al. | |
| 4,558,975 | A | * | 12/1985 | Hale | ............................ 408/186 |
| 6,527,486 | B2 | | 3/2003 | Wiman et al. | |

FOREIGN PATENT DOCUMENTS

| DE | 201 18 111 U1 | | 4/2002 |
| DE | 102 35 606 A1 | | 2/2004 |
| EP | 112136 A2 | * | 6/1984 |
| EP | 0 775 547 A1 | | 5/1997 |
| JP | 2001181205 A | * | 7/2001 |
| JP | 2001252809 A | * | 9/2001 |
| JP | 2006281391 A | * | 10/2006 |
| WO | 03/099494 | | 12/2003 |
| WO | 03/099495 | | 12/2003 |

OTHER PUBLICATIONS

EPO website machine translation of DE 10235606, printed Nov. 2011.*

* cited by examiner

*Primary Examiner* — Daniel Howell
(74) *Attorney, Agent, or Firm* — Morgan, Lewis & Bockius LLP

(57) ABSTRACT

A drill includes a center insert which is indexable, mounted in a center pocket, and has an elongate basic shape. One of two opposite longitudinal side contact surfaces of the cutting insert which run parallel to each other are urged against the side support surface of the center pocket. The side support surface of the center pocket is inclined in relation to the center axis of the drill body at an acute angle within the range of 3-8 degrees. An intermediate surface is formed between the side contact surface and an end surface. The intermediate surface is shorter than the side contact surface and forms an obtuse angle with the side contact surface.

19 Claims, 6 Drawing Sheets

INDEXABLE INSERT DRILL AND A CENTER INSERT THEREFORE

This application claims priority under 35 U.S.C. §119 to Swedish Patent Application No. 0700237-1, filed on Jan. 29, 2007, the disclosure of which is incorporated by reference herein in its entirety.

FIELD OF THE INVENTION

The present invention relates generally to a drill for chip removing machining of the type that includes, on one hand, a drill body that is rotatable around a center axis and has a rear end and a front end from which there extends rearward an envelope surface in which two chip flutes having an insert pocket each are countersunk, and on the other hand two replaceable cutting inserts, viz. a peripheral cutting insert mounted in a peripheral pocket and a center insert. The center insert is indexable and mounted in a center pocket that opens in the front end of the drill body and is delimited by a bottom surface, a rear end support surface, a side support surface of a central partition wall, and an inside of a border adjacent to the envelope surface. The center insert includes an upperside and an underside between which a through hole for a tightening screw extends, and has an elongate basic shape that is mirror-symmetrical in relation to an imaginary, longitudinal central plane with which a center axis of the hole coincide. One of two opposite, longitudinal side contact surfaces, which run parallel to each other and to the central plane, is urged against the side support surface of the center pocket. One of the two opposite end surfaces, which are formed adjacent to chip-removing cutting edges at the short ends of the center insert, is urged against the end support surface of the center pocket. The present invention also relates generally to a center insert for indexable insert drills.

BACKGROUND OF THE INVENTION

The designing of tools, in particular rotatable tools such as drills for cutting or chip removing machining, involves a constant give-and-take between conflicting technical and economic constraints. Modern cutting tools are mostly composed of a basic body and one or more hard cutting inserts or wear bodies, which can be discarded after completed use. In such a way, long use of the comparatively expensive basic body is enabled (e.g., 10 to 30 insert exchanges). The plurality of requirements and desires that are made on the tools include good machining results in respect of precision, surface quality, repeatability and speed; low costs of the manufacture of the basic body as well as the cutting inserts; great strength of the tool in order to withstand severe stresses and rapid feeding; good chip control; etc.

The need for compromise becomes particularly evident in the designing of drills of the type that makes use of replaceable cutting inserts, and that by those skilled in the art are denominated indexable insert drills. Indexable insert drills having large or medium-sized holing diameters give rise to delicate balancing as a consequence of the complicated character of the drilling operation in respect of, for instance, chip control, balance, chip removal capacity, and the fact that the speed of rotation in the different parts of the drill body decreases from a maximum value at the periphery toward zero in the center of the drill body. However, the difficulties become particularly serious when indexable insert drills for small holes, i.e., holes having a small diameter, are to be produced. For spatial reasons, neither the cutting inserts, nor the pockets of the drill body for the inserts, can be made unlimitedly small. In particular, if the cutting inserts could be made comparatively sturdy, this will be on the expense of the material that surrounds the insert pockets in the basic body, i.e., the latter would become weakened. Conversely, a decreasing quantity of material (cemented carbide) in the cutting insert weakens the insert. Moreover, in small indexable insert drills, there is a special limitation so far that the only way in which the individual cutting insert can be fixed in the appurtenant pocket is to secure the insert by a screw, which has to have the head thereof countersunk in the hole in the cutting insert. Among other things for reasons of strength, the screw has to have a certain smallest diameter (e.g.,>1.8 mm), which in turn means that the width of the cutting insert cannot be less than a certain minimum measure. Furthermore, the center insert should be protected inside a radially outer border, which during the drilling operation fills out the space between the center insert and the hole wall, in order to obviate the risk of chip stopping between the center insert and the hole wall.

In practice, the difficulties and limitations pointed out above have meant that previously known indexable insert drills of the type mentioned initially have not been possible to be made with diameters smaller than 12.7 mm. In the patent literature, thick and medium thick indexable insert drills having two-fold or four-fold indexable center inserts are disclosed in, for instance, U.S. Pat. No. 6,527,486, and International Patent Application Publication Nos. WO 03/099494 and WO 03/099495.

In this connection, the lack of space in a thin drill body is most problematic for the center insert and the pocket thereof, but less for the peripheral cutting insert and the pocket thereof. Thus, the peripheral pocket not only may, but should open in the envelope surface of the drill body. However, the center pocket should open only in the front end surface of the drill body and be situated inside a protecting border adjacent to the envelope surface in order to avoid chip stopping between the center insert and the hole wall generated.

An object of the invention to provide design conditions for the manufacture of a reliably operating indexable insert drill having a diminutive holing diameter, e.g., diameters less than 12.7 mm, without lowering the strength and service life of the cutting inserts, the stiffness and strength of the drill body, the balance of the drill, or the dimensions of the tightening screws.

Theoretically, the fundamental problem to provide an indexable insert drill for small holes could be solved by simply making the center insert thinner and locating the insert parallel to the center axis of the drill body. In such a way, a resistant protection border could be retained outside the center pocket. Because not only two cutting inserts, but also surrounding material in the drill body, having to be accommodated within a space of approx. 12 mm (or less), such a cutting insert would, however, become too weak, in particular in the thin portions that surround the screw hole. Another alternative would be to use a sufficiently wide and strong cutting insert and reduce the material (usually steel) that is present in the protection border, as well as in the partition wall that separates the two pockets. However, this alternative cannot be realized in practice, because such a material reduction would jeopardize the stiffness and the strength of the front end of the drill body. The last-mentioned alternative would be non-expedient even if the center pocket would be tilted in relation to the center axis, because then the protection border would become too thin or partly cut away.

SUMMARY OF THE INVENTION

In an embodiment, the invention provides a drill for chip removing machining, including a drill body that rotates around a center axis (C1) and has a rear end, and a front end from which there extends rearward an envelope surface in which two chip flutes each having an insert pocket are countersunk, and two replaceable cutting inserts, including a peripheral cutting insert mounted in a peripheral pocket, and a center insert, which is indexable and mounted in a center pocket that opens in the front end of the drill body and is delimited by a bottom surface, a rear end support surface, a side support surface of a partition wall, and an inside of a border adjacent to the envelope surface. The center insert includes an upperside and an underside between which a through hole for a tightening screw extends, and has an elongate basic shape that is mirror-symmetrical in relation to an imaginary, longitudinal central plane (P) with which a center axis (C3) of the hole coincides. One of two opposite, longitudinal side contact surfaces of the cutting insert which run parallel to each other and to the central plane (P), are urged against the side support surface of the center pocket. One of the two opposite end surfaces which are formed adjacent to chip-removing cutting edges at the short ends of the center insert, are urged against the rear end support surface of the center pocket. The side support surface of the center pocket is inclined in relation to the center axis (C1) of the drill body at an acute angle ($\epsilon$) within the range of 3-8°. At each one of two diagonally opposite corners of the center insert, an intermediate surface is formed between the side contact surface and an end surface. The intermediate surface is shorter than the side contact surface and forms an obtuse angle ($\alpha$) with the side contact surface. One of the intermediate surfaces is located in an area of a clearance space between the side support surface of the center pocket and the end support surface of the center pocket.

In another embodiment, the invention provides an indexable center insert for indexable insert drills, including an upperside and an underside between which a through hole extends, an elongate basic shape that is mirror-symmetrical in relation to an imaginary, longitudinal central plane (P) with which a center axis (C3) of the hole coincides, two opposite, longitudinal side contact surfaces running parallel to each other and to the central plane (P), and end support surfaces being formed adjacent to chip-removing cutting edges at two opposite short ends. At each one of two diagonally opposite corners of the cutting insert, an intermediate surface is formed between the end surface and a side contact surface, the intermediate surface being shorter than the side contact surface and forming an obtuse angle ($\alpha$) with the side contact surface.

By forming, in accordance with the invention, obtuse-angled inclined intermediate surfaces in the extension of the two side support surfaces of the cutting insert, the insert is given a tapering shape at the two opposite short ends thereof. This means that the cutting insert can retain the desired width and strength in the most sensitive part thereof, viz. the intermediate part adjacent to the screw hole. In combination with a suitable inclination of the cutting insert in relation to the center axis of the drill body, this tapering end shape can be utilized to provide a center pocket that, on one hand, is sufficiently large to accommodate the wide intermediate section of the cutting insert, and on the other hand placed and formed in such a way that it does not require an unacceptable sacrifice of material in the drill body. In other words, the center pocket can be formed without detrimentally affecting the stiffness and the strength of the front end of the drill body.

BRIEF DESCRIPTION OF THE DRAWINGS

The accompanying drawings, which are incorporated herein and constitute part of this specification, illustrate the presently preferred embodiments of the invention, and together with the general description given above and the detailed description given below, serve to explain features of the invention.

DETAILED DESCRIPTION OF THE PREFERRED EMBODIMENTS

Figure 1:
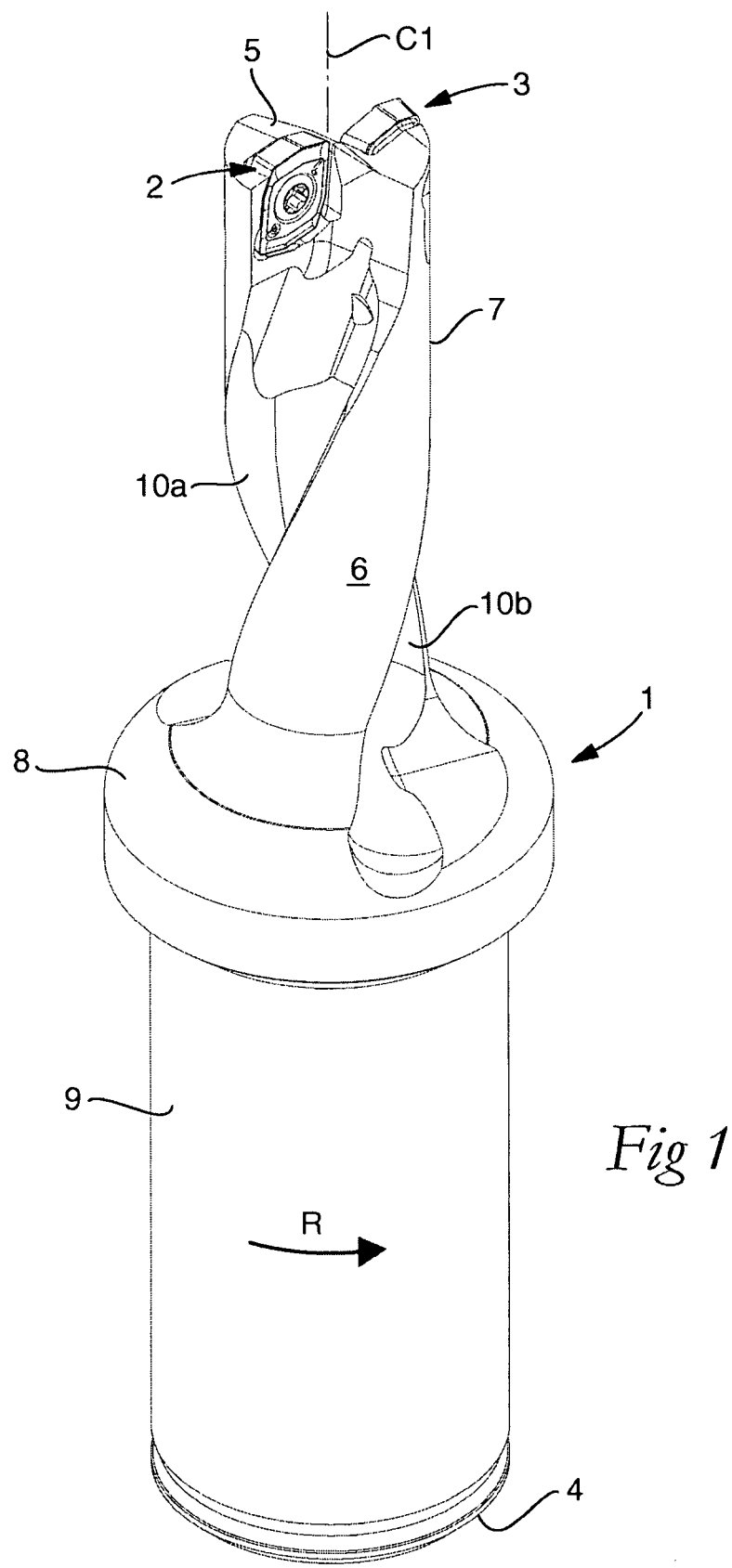
FIG. 1 is a perspective view of a drill according to an embodiment of the invention.
Figure 2:
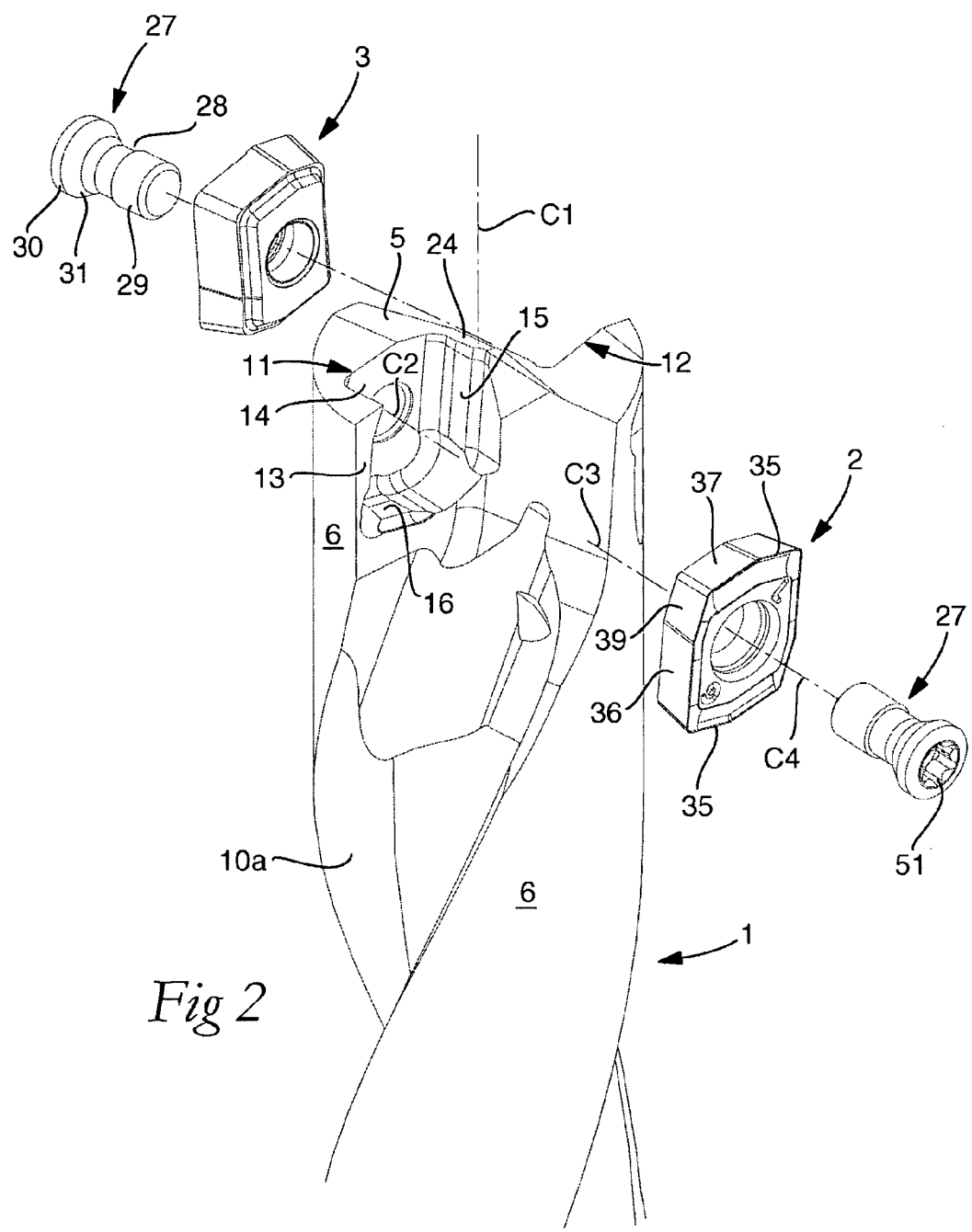
FIG. 2 is a partly sectioned, perspective exploded view showing two cutting inserts of the drill, as well as tightening screws for the inserts, spaced-apart from the drill body of the tool.

FIGS. 1 and 2 illustrate an indexable insert drill that includes a basic body or drill body 1, and two cutting inserts 2, 3, one of which is a center insert 2 and the other of which is a peripheral cutting insert 3. The drill body 1 is rotatable in the rotational direction R around a center axis C1, and includes a rear end 4 as well as a front end 5, which is represented by an end surface composed of a plurality of part surfaces. Rearward from the front end 5, an envelope surface 6 extends on a front, cylindrical part 7 of the drill body. The front, shank-like part 7 ends in a collar 8, which in turn transforms into a rear part 9 in the form of a fixing part that is fixable in a machine (not shown). In the part 7, two chip flutes 10a, 10b are formed, which in this case are helicoidal and extend from the front end 5 of the drill body to the collar 8.

The proper drill body 1 may—but does not need to—be solid and manufactured from, for instance, steel, while the cutting inserts 2, 3 are manufactured from a harder and more wear-resistant material, such as cemented carbide or the like. Because of the costs, indeed steel is preferred as a basic material of the drill body 1.

In the immediate vicinity of the front end 5 of the drill body, pockets are formed for the receipt of the two cutting inserts, viz. a center pocket 11 for the center insert 2 and a peripheral pocket 12 for the peripheral cutting insert 3. Both pockets open in the front end surface. However, there is a difference between the pockets so far that the peripheral pocket 12 also opens in the envelope surface 6, while the center pocket 11 is spaced-apart from the envelope surface via a border 13.

Figure 3:
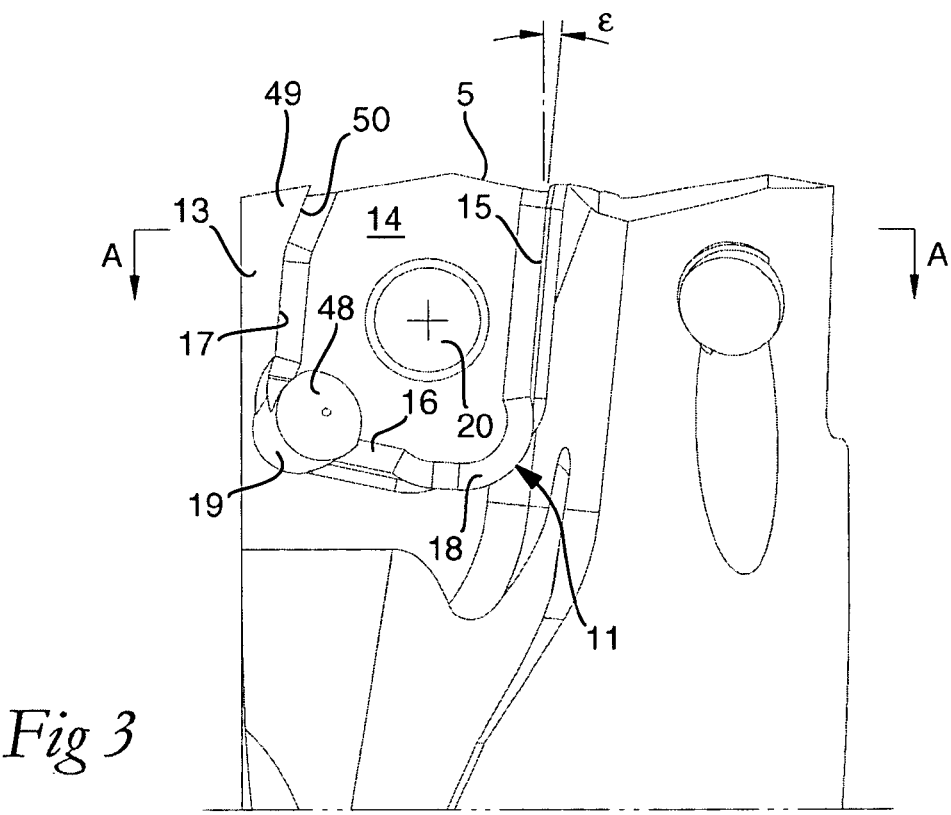
FIG. 3 is a partial side view of the front end of the drill body without cutting inserts.
Figure 4:
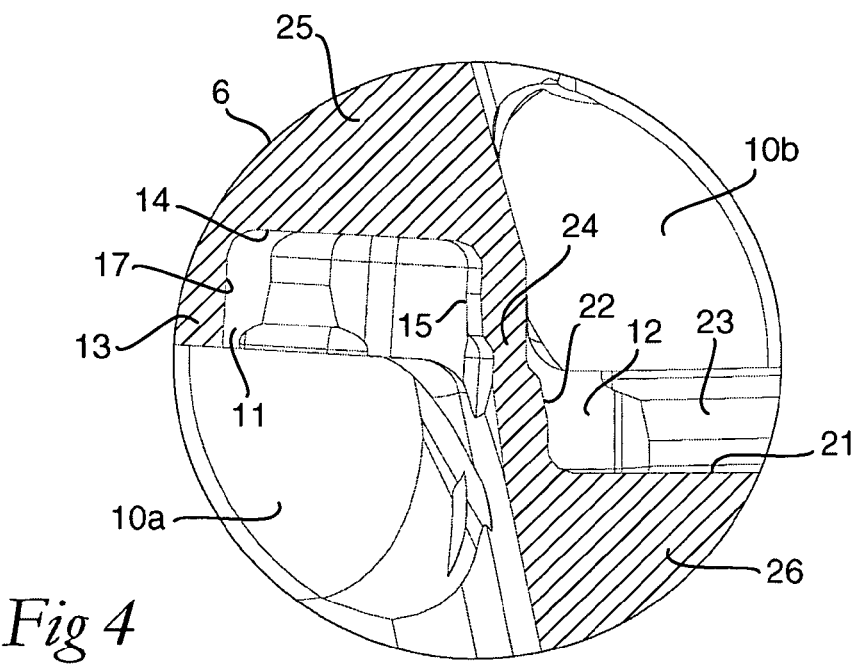
FIG. 4 is a cross section A-A in FIG. 3.
Figure 5:
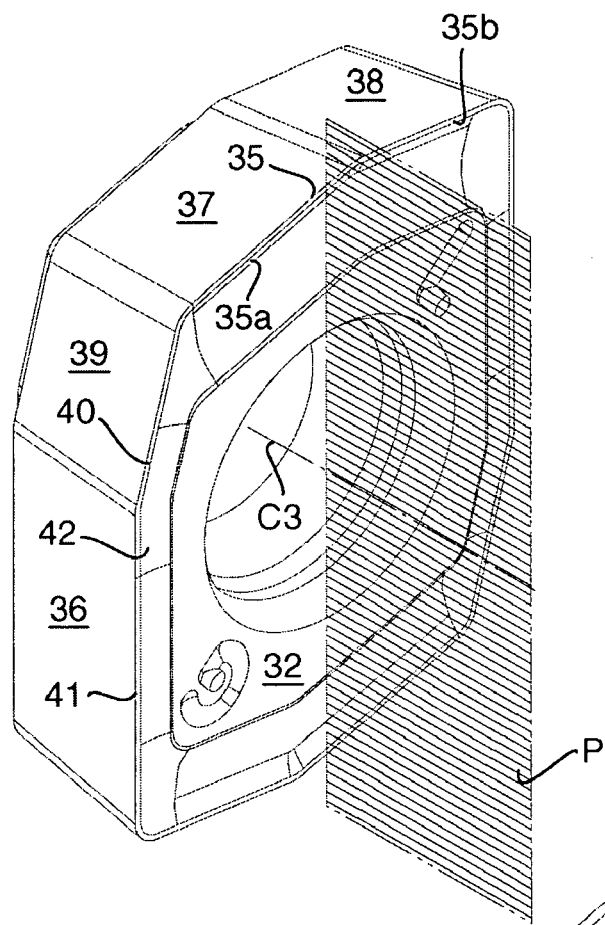
FIG. 5 is an enlarged perspective view showing the center insert of the drill as viewed from the upperside.
Figure 6:
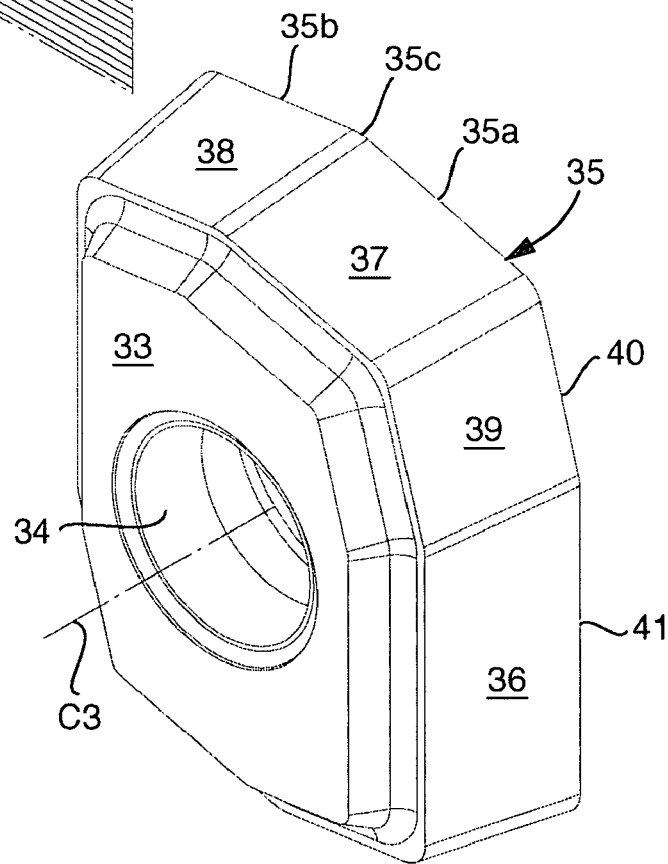
FIG. 6 is a perspective view showing the same cutting insert from the underside.

Reference is now made to FIGS. 3 and 4, which in detail illustrate the nature of the center pocket 11. More precisely, the pocket 11 is delimited by a bottom in the form of a plane surface 14, a longitudinal side support surface 15, a rear end support surface 16, as well as an inside 17 of the aforementioned border 13. At the two inner, or axially rear, corners in the pocket, clearance spaces 18, 19 are formed in which two inactive corners of the center insert 2 can be housed without contacting the basic body. The two support surfaces 15, 16 are advantageously plane and form obtuse angles with the bottom surface 14. In the bottom surface 14, a hole 20 mouths having an internal thread, i.e., female thread. The center axis of hole 20 is designated C2 (see FIG. 2).

The peripheral cutting insert 3 and the pocket 12 thereof is incidental in the context of the invention. However, it should, reference being made to FIG. 4, be pointed out that the peripheral pocket 12—in analogy with the center pocket—is delimited by a plane bottom surface 21, a longitudinal side support surface 22 and a transverse, rear end support surface 23. In FIG. 4, it is furthermore seen that the two pockets 11, 12 are spaced-apart from opposed chip flutes 10a, 10b via a partition wall 24, which extends between two material sections 25, 26. More precisely, the partition wall 24 separates the center pocket 11 from the chip flute 10b that extends rearward from the peripheral pocket 12, and vice versa.

In FIG. 2, it is seen how the two cutting inserts 2, 3 are fixable by screws 27, which advantageously are identical in order to be usable for any one of the cutting inserts. Each screw includes a cylindrical shank 28 having a male thread 29, as well as a head 30 having a conical shape. More precisely, the head includes a cone surface 31, which is urgable against a co-operating cone surface in a hole of the respective cutting insert, as well as a key grip 51.

As has previously been pointed out, known drills have not been allowed to be designed with holing diameters less than 12.7 mm. A decisive reason therefore, is that the center insert of the known drills has had a shape of uniform width all the way between opposite, chip-removing cutting edges.

Now reference is made to FIGS. 5-8, which on an enlarged scale illustrate the nature of the center insert 2 according to an embodiment of the invention. The cutting insert includes an upperside 32 and an underside 33, between which a through hole 34 extends, the center axis of which is designated C3. Furthermore, the cutting insert has an elongate basic shape by having a total length L1 that is at least somewhat greater than the width W. More precisely, the shape is mirror-symmetrical in relation to an imaginary, longitudinal central plane P (see FIGS. 5 and 7) with which the center axis C3 of the hole 34 coincides (with mirror-symmetry it is understood that if one of the two halves of the cutting-insert contour (e.g., the right half in FIG. 7) is assumed to be mirror-inverted, then the two halves become symmetrical in relation to the central plane P). At the two opposite short ends of the cutting insert, cutting edges 35 are formed, which in this case are angularly broken and include two part edges 35a, 35b that converge into an inflection point 35c. Two opposite, longitudinal side surfaces 36 run parallel to the central plane P and alternately serve as contact surfaces against the side support surface 15 of the center pocket. To the part edges 35a, 35b, end surfaces 37, 38 connect, the first-mentioned one 37 of which (together with the part edge 35a) is longer than the last-mentioned one 38 (together with the part edge 35b). The part surface 37 serves as a clearance surface adjacent to the forwardly indexed, active cutting edge, while the part surface 38 alternately may serve either as clearance surface or as an end contact surface for abutment against the end support surface 16 of the pocket 11. In this connection, the contact surfaces 36, 38 both are somewhat longer than the support surfaces 15 and 16, respectively, against which they are urged.

Characteristic of the invention is that between the individual side contact surface 36 and the end surface of the cutting insert, as represented by the part surface 37, an intermediate surface 39 is formed that forms an obtuse angle α (see the borderlines 40, 41 in FIG. 7) with the side contact surface 36. Due to intermediate surface 39, the cutting insert is given a tapering shape toward the short ends thereof. In other words, the cutting insert is not uniform in width all the way between the opposite short ends thereof.

Figure 8:
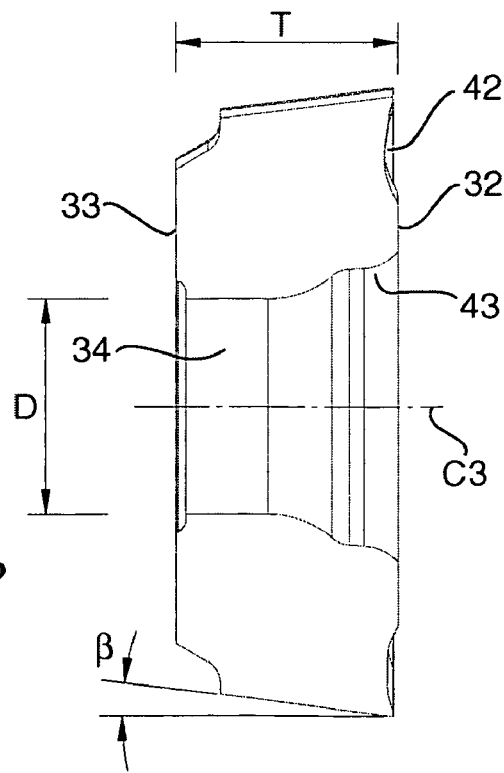
FIG. 8 is a longitudinal section B-B through the cutting insert according to FIG. 7.

In the same way as the end surfaces 37, 38 transform into the upperside of the cutting insert via edges, which form part edges 35a, 35b, the intermediate surface 39 and the side contact surface 36 transform into the upperside via edges or borderlines 40, 41. However, none of the edges 40, 41 have any chip-removing function. For practical reasons of manufacture, the edges 40, 41 are however formed in the same way as the edges 35a, 35b that together form the cutting edge 35, all edges 35a, 35b, 40 and 41 being included in a continuous peripheral edge line in the form of a reinforcement bevel. In this case, the upperside of the cutting insert is a plane surface 32 on a land, which is spaced-apart from the peripheral edge line via a circumferential groove 42 serving as a chip breaker adjacent to the cutting edges 35. The surface 32 is situated on a certain level above the edge line, as is seen in FIG. 8. With continued reference to FIG. 8, all side surfaces of the cutting insert have a certain clearance angle β, which in the example amounts to 7°. However, the clearance angle may vary and even be different for different side surfaces. In FIG. 8, it is further seen that the hole 34 includes a funnel-like mouth 43, which widens toward the upperside 32 and receives the screw head 30 in a countersunk state. The screw head being countersunk in the cutting insert in the mounted state is important so that the same is protected against premature wear. However, a detrimental consequence is that the mouth space 43 trespasses on the material of the cutting insert.

Figure 7:
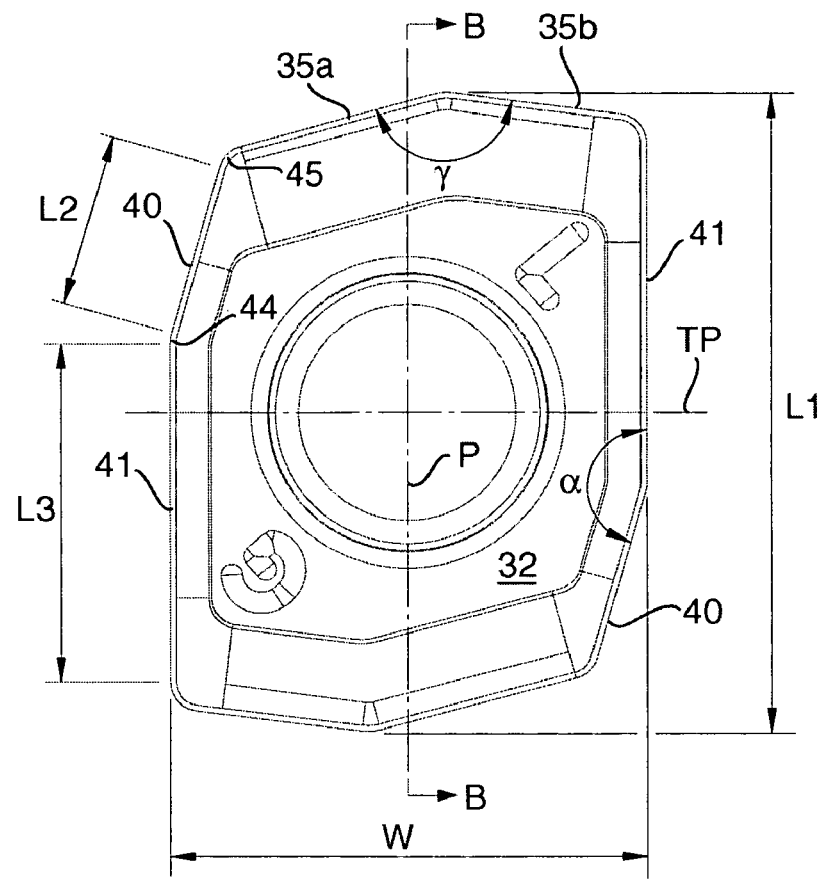
FIG. 7 is a planar view from above of the center insert showing geometry data for the same.

In FIG. 7, TP designates a cross-plane that extends perpendicularly to the longitudinal central plane P and coincides with the center axis of the hole. As is seen in FIG. 7, the edge line 41 of the side contact surface 36 extends past the cross-plane TP before the intermediate surface 39 and the edge line 40 thereof follow on. More precisely, the edge line 40 extends from a first inflection point 44 adjacent to the edge line 41 and a second inflection point 45 adjacent to the part edge 35a. Irrespective of the design of the cutting edge 35 (broken or not broken), the edge line 40 and the appurtenant intermediate surface 39 are always shorter than the edge line 41 and the side contact surface 36 adjacent to the same. In practice, the length L2 of the edge line 40 should amount to at most 80% of the length L3 of the edge line 41. On the other hand, the length L2 should amount to at least 25% of L3. In the shown, preferred example, L2 amounts to about 50% of L3.

In the example, the obtuse angle α amounts to 168.5°. This angle may vary, more precisely depending on the length of the edge line 40 (and thereby the distance between the inflection point 44 and the cross-plane TP). Generally, it applies that the angle α can decrease with decreasing edge length L2, and vice versa. However, even if the inflection point 44 would be situated near the cross-plane TP, the angle α should not be more than 172°. On the other hand, the same should not be less than 155° even if the inflection point 44 would be situated at a great distance from the cross-plane TP.

In the example, the obtuse angle y between the part edges 35a, 35b amounts to 158°. This angle may also vary, preferably within the range of 140-170°. However, the shape of the individual cutting edge at each short end may be chosen in many different ways. For instance, the edge may be at least partially arched (or entirely straight).

Figure 9:
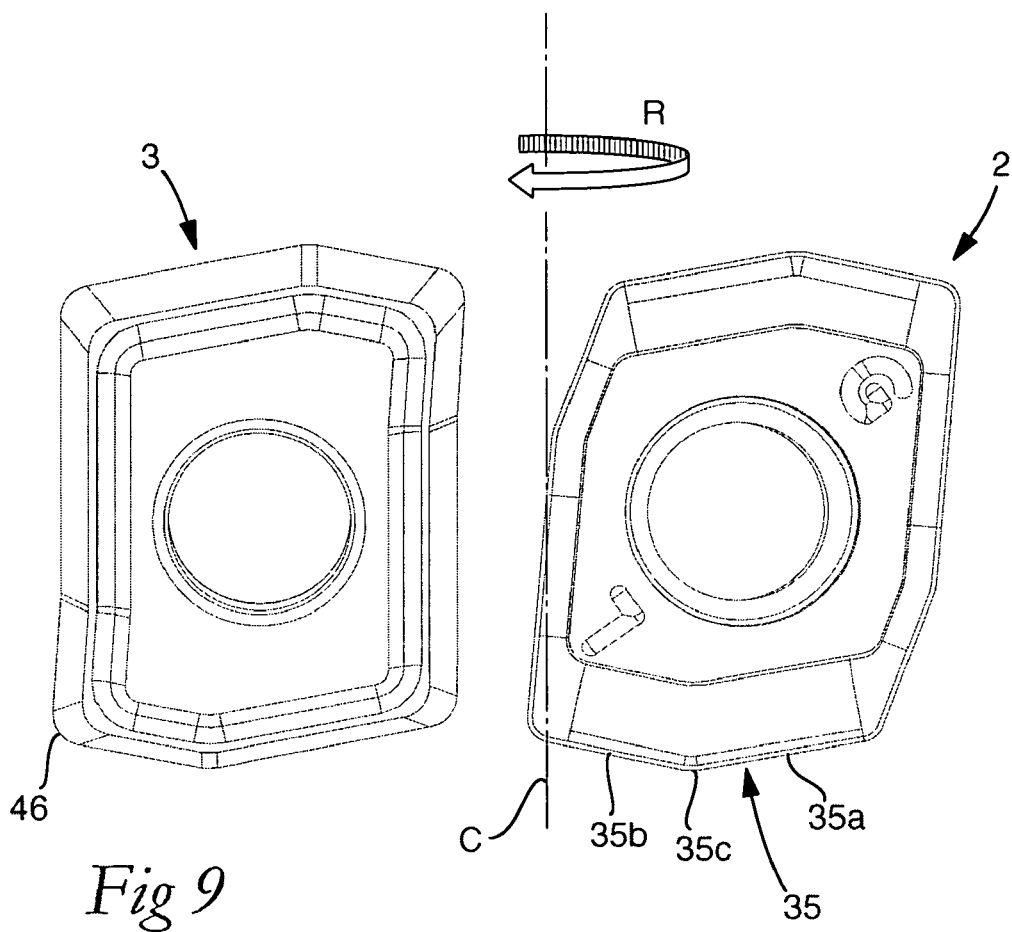
FIG. 9 is a schematic view showing the mutual position of the center and peripheral cutting inserts of the drill.
Figure 10:
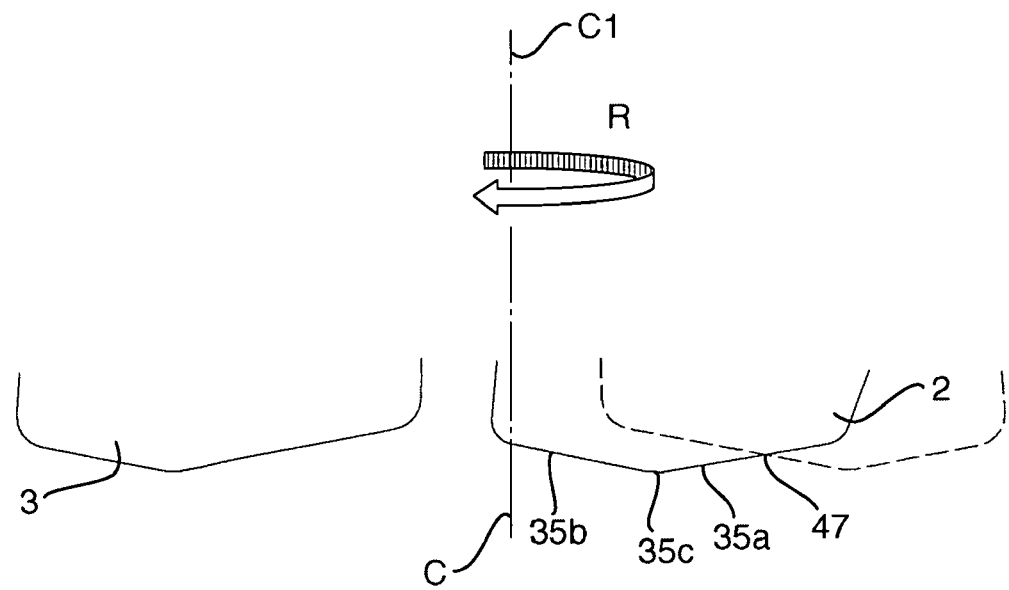
FIG. 10 is a schematic illustration showing the overlapping between the cutting inserts according to FIG. 9.

Reference is now made to FIGS. 9 and 10, which illustrate how the two cutting inserts 2, 3 of the drill co-operate during operation. From FIG. 10, it is seen that the sweep areas of the two cutting inserts overlap each other. The diameter of the recessed hole is determined exclusively by the peripheral cutting insert 3, more precisely by the radial distance between the center axis C and the active corner 46 of the cutting insert in the transition between a chip-removing main edge and a surface-wiping secondary edge. The sweep areas of the two cutting inserts cutting intersect each other in a circular line represented by the point 47 in FIG. 10. The fact that the sweep areas of the edges overlap each other in this way, means in practice that only the part of the cutting edge 35 of the center insert 2 that extends from the point of intersection 47 to the center axis C1 actively removes chips. In other words, the radially inner portion of the part edge 35b as well as the radially outer portion of the part edge 35a, as well as the edge line 40 along the intermediate surface, are inactive during drilling.

Here, it should be mentioned that the center insert as well as the peripheral cutting insert are intended to be used with drill bodies having different diameters included in a set of drills within a certain diameter interval, e.g., 12-14 mm (12 mm, 12.5 mm, 13 mm, 13.5 mm and 14 mm). This is effected by forming the insert pockets at different radial distances from the center axis depending on the drill diameters. In doing so, the above-mentioned sweep areas are altered, more precisely in such a way that the point of intersection 47 is located near the inflection point 35c (and the center axis C1) in the smallest drill, and then further away from the same at increasing diameter of the thicker drills in the set.

The two cutting inserts as well as the pockets for the same are exceptionally small. Thus, the center insert 2 in the example (which relates to a 12 mm drill) has a width W that amounts to only 4.8 mm, and a total length L1 of about 6.5 mm. Furthermore, the cutting insert has a thickness T that amounts to 2.35 mm, while the diameter D of the hole 34 amounts to 2.2 mm (=about 45% of the width W). Therefore, in order to create a drill that is sufficiently strong to fulfill practical drilling, each tenth of a millimeter of material in the cutting insert as well as the drill body is valuable.

When the drill body 1 is manufactured from steel, the two insert pockets are made by chip removing machining, normally only in the form of milling. Milling of the clearance space 18 is a material-consuming operation. This operation is in practice carried out by a shank-end mill having a certain smallest diameter. If the center insert would have been uniform in width and therefore have had a marked corner between the side contact surface and the short end (such as is the case in U.S. Pat. No. 6,527,486), then it would have, for the provision of the clearance space 18, been necessary to mill off so much material from the drill body that the strength of the partition wall 24 would be lost. By providing the cutting insert with the described intermediate surface 39, which gives the cutting insert the tapering shape thereof, the clearance space 18 can, however, be made with a minimal volume that does not make appreciable use of material from the partition wall. Also the fact that the side support surface 15 (and thereby the center pocket in its entirety) are inclined at an acute angle ε (see FIG. 3) to the center axis C1, more precisely in the direction outward/rearward from the front end of the side support surface, contributes significantly to this effect.

In the shown, preferred embodiment, the angle ε amounts to 5°. However, within the scope of the invention, moderate variations of the inclination of the center pocket may occur. However, at all events, the angle ε should amount to at least 3° and at most 8°. Suitably, the angle ε is within the range of 4-7°.

In the shown, preferred embodiment, the second clearance space 19 for the radially outer, inactive corner of the cutting insert is made by drilling instead of by milling. In such a way, the concave part surface, which delimits the space, can be made in the form of a cylinder surface, the diameter of which is very moderate. Thus, in the example, the cylinder surface is provided using a drill the diameter of which amounts to about 1.2 mm. As a result of the drilling operation, a conical countersink 48 is obtained in the bottom surface 14. By drilling (instead of milling) the clearance space 19, it is ensured that the peripherally situated, protecting border 13 is not penetrated. In other words, the border retains the desired stiffness along the entire length thereof.

As is seen in FIG. 3, the front end of the border 13 includes a wedge-shaped material portion 49, the inside 50 of which forms an obtuse angle with the rest of the inside 17. In practice, the obtuse angle between the surfaces 17, 50 should be as large as the obtuse angle α between the side contact surface 36 of the cutting insert and the intermediate surface 39 thereof. By the existence of the wedge-shaped portion 49, it is ensured that the space between the radially outer side of the center insert and the hole wall generated is filled out completely. In such a way, chip jamming between the cutting insert and the hole wall is avoided.

In this connection, the cutting insert, besides against the bottom surface 14, only rests against the support surfaces 15, 16, but not against the inside of the border 13. Here, there is a minimal play between adjacent surfaces. Furthermore, the border 13, as a consequence of the inclination of the center pocket in relation to the center axis, obtains an increasing thickness in the direction axially forward. Simultaneous pressing of the contact surfaces 36, 38 of the cutting insert against the support surfaces 15, 16 is provided by the fact that the screw 27 has an inherent elasticity that can be utilized to apply a lateral tightening force to the cutting insert.

By providing the center insert with a tapered shape toward the respective short ends and simultaneously tilting the center pocket at a moderate acute angle to the center axis, it is ensured that the center pocket is delimited by sufficient material in the partition wall as well as the protection border for ensuring sufficient strength in the front end of the drill body. Furthermore, the cutting insert can be given sufficient strength in the most sensitive area thereof, viz. in the two portions that are situated in the cross-plane TP and surround the screw hole. The fact that the two short ends of the cutting insert has been tapered off, have accordingly no effect on the strength of the cutting insert in the area of the hole.

While the invention has been disclosed with reference to certain preferred embodiments, numerous modifications, alterations, and changes to the described embodiments are possible without departing from the sphere and scope of the invention, as defined in the appended claims and their equivalents thereof. Thus, indexable insert drills may be designed having holing diameters less than 12 mm using the principle according to the invention. Furthermore, the geometrical design of the center insert, as well as of the center pocket, may vary within the scope of the invention. For instance, the described intermediate surfaces do not necessarily need to be plane and have straight edge lines, but may have other shapes, e.g., convex. Within the scope of the invention, it is also possible to modify relative dimensions of the center insert and the pocket thereof, e.g., so far that the length of the cutting insert is reduced in relation to the width, provided that the elongate basic shape is retained. Accordingly, it is intended that the invention not be limited to the described embodiments, but that it have the full scope defined by the language of the following claims.

What is claimed is:

1. A drill for chip removing machining, comprising:
   a drill body that rotates around a center axis (C1) and has a rear end, and a front end from which there extends rearward an envelope surface in which two chip flutes each having an insert pocket are countersunk; and two replaceable cutting inserts, including a peripheral cutting insert mounted in a peripheral pocket, and a center insert, which is indexable and mounted in a center pocket that opens in the front end of the drill body and is delimited by a bottom surface, a rear end support surface, a side support surface of a partition wall, and an inside of a border adjacent to the envelope surface;

the center insert including an upperside and an underside between which a through hole for a tightening screw extends, and having an elongate basic shape that is mirror-symmetrical in relation to an imaginary, longitudinal central plane (P) with which a center axis (C3) of the hole coincides such that the central plane (P) divides the shape into two portions, a first portion being symmetrical with a second portion in relation to the central plane (P) when the first portion is inverted about an axis orthogonal to the central plane (P), and one of two opposite, longitudinal side contact surfaces of the cutting insert which run parallel to each other and to the central plane (P), being urged against the side support surface of the center pocket, and one of the two opposite end surfaces which are formed adjacent to chip-removing cutting edges at the short ends of the center insert, being urged against the rear end support surface of the center pocket;

wherein the side support surface of the center pocket is inclined in relation to the center axis (C1) of the drill body at an acute angle ($\epsilon$) within the range of 3-8°; and wherein, at each one of two diagonally opposite corners of the center insert, an intermediate surface is formed between the side contact surface and an end surface, the intermediate surface being shorter than the side contact surface and forming an obtuse angle ($\alpha$) with the side contact surface, one of the intermediate surfaces being located in an area of a clearance space between the side support surface of the center pocket and the end support surface of the center pocket.

2. The drill according to claim 1, wherein the obtuse angle ($\alpha$) between the side contact surface and intermediate surface of the center insert amounts to at least 155°.

3. The drill according to claim 1, wherein the obtuse angle ($\alpha$) between the side contact surface and intermediate surface of the center insert amounts to at most 172°.

4. The drill according to claim 1, wherein the cutting edge of the center insert includes two part edges extending at an obtuse angle ($\gamma$) to each other and to which two end part surfaces connect, a first one of which transforms into an intermediate surface and serves as a clearance surface, a second one of which transforms into a side contact surface and alternatingly serves as clearance surface and end contact surface when the center insert is indexed.

5. The drill according to claim 4, wherein the obtuse angle ($\gamma$) between the part edges of the center insert is within the range of 140-170°.

6. The drill according to claim 4, wherein the first end part surface of the center insert is longer than the second end part surface.

7. The drill according to claim 1, wherein the intermediate surface of the center insert has a length (L2), as viewed along an upper borderline, which amounts to at most 80% of the corresponding length (L3) of the side contact surface.

8. The drill according to claim 1, wherein the intermediate surface of the center insert has a length (L2), as viewed along an upper borderline, which amounts to at least 30% of the corresponding length (L3) of the side contact surface.

9. The drill according to claim 1, wherein the center pocket includes a second clearance space situated between the end support surface and the inside of the border and delimited by a partially cylindrical surface, which is made by drilling resulting in a countersink in the bottom surface of the pocket.

10. The drill according to claim 1, wherein the thickness of the border increases from a rear end toward a front end.

11. The drill according to claim 1, wherein the front end of the border includes a wedge-shaped material portion having an inside that forms an obtuse angle with the rest of the inside.

12. An indexable center insert for indexable insert drills, comprising:

an upperside and an underside between which a through hole extends;

an elongate basic shape that is mirror-symmetrical in relation to an imaginary, longitudinal central plane (P) with which a center axis (C3) of the hole coincides such that the central plane (P) divides the shape into two portions, a first portion being symmetrical with a second portion in relation to the central plane (P) when the first portion is inverted about an axis orthogonal to the central plane (P);

two opposite, longitudinal side contact surfaces running parallel to each other and to the central plane (P); and end support surfaces being formed adjacent to chip-removing cutting edges at two opposite short ends;

wherein, at each one of two diagonally opposite corners of the cutting insert, an intermediate surface is formed between the end surface and a side contact surface, the intermediate surface being shorter than the side contact surface and forming an obtuse angle ($\alpha$) with the side contact surface.

13. The center insert according to claim 12, wherein the obtuse angle ($\alpha$) between the side contact surface and the intermediate surface amounts to at least 155°.

14. The center insert according to claim 12, wherein the obtuse angle ($\alpha$) between the side contact surface and the intermediate surface amounts to at most 172°.

15. The center insert according to claim 12, wherein the cutting edge includes two part edges extending at an obtuse angle ($\gamma$) to each other and to which two end part surfaces connect, a first one of which transforms into an intermediate surface and serves as a clearance surface, a second one of which transforms into a side contact surface and alternatingly serves as clearance surface and end contact surface when the insert is indexed.

16. The center insert according to claim 15, wherein the obtuse angle ($\gamma$) between the part edges is within the range of 140-170°.

17. The center insert according to claim 15, wherein the first end part surface is longer than the second end part surface.

18. The center insert according to claim 12, wherein the length (L2) of the intermediate surface, as viewed along an upper borderline, amounts to at most 80% of the corresponding length (L3) of the side contact surface.

19. The center insert according to claim 12, wherein the length (L2) of the intermediate surface, as viewed along an upper borderline, amounts to at least 30% of the corresponding length (L3) of the side contact surface.

* * * * *